United States Patent
Gotoh

[11] Patent Number: 5,838,981
[45] Date of Patent: Nov. 17, 1998

[54] DATA COMMUNICATION APPARATUS WITH A PROGRAM RENEWAL FUNCTION

[75] Inventor: Hirokazu Gotoh, Atsugi, Japan

[73] Assignee: Ricoh Company, Ltd., Tokyo, Japan

[21] Appl. No.: 716,128

[22] Filed: Sep. 20, 1996

[30] Foreign Application Priority Data

Oct. 5, 1995 [JP] Japan .................................. 7-284693

[51] Int. Cl.⁶ .................................................. G06F 12/12
[52] U.S. Cl. ...................... 395/712; 395/651; 395/652; 395/653; 707/203
[58] Field of Search ........................... 395/712, 651–653, 395/800.37; 707/203; 364/280.7, 286, 286.6, 975.1, 962.1

[56] References Cited

U.S. PATENT DOCUMENTS

| | | | |
|---|---|---|---|
| 5,408,672 | 4/1995 | Miyazawa et al. | 395/800.37 |
| 5,410,703 | 4/1995 | Nilsson et al. | 395/712 |
| 5,469,573 | 11/1995 | McGill, III et al. | 395/712 |
| 5,623,604 | 4/1997 | Russell et al. | 395/712 |
| 5,630,139 | 5/1997 | Ozaki | 395/712 |

*Primary Examiner*—Emanuel Todd Voeltz
*Assistant Examiner*—Hal D. Wachsman
*Attorney, Agent, or Firm*—Oblon, Spivak, McClelland, Maier & Neustadt, P.C.

[57] ABSTRACT

A data communication apparatus which has a program renewal operation to renew an original program with a renewal program. The original program is stored in a first non-volatile memory, which also stores the renewal program after the program renewal operation has been completed. A second memory, which is distinct from this first memory, stores at least a predetermined portion of the original program during the program renewal operation. A controller renews the original program in the first memory with the renewal program by accessing the at least predetermined portion of the original program in the second memory during the program renewal operation. In one embodiment the original and renewal programs are system programs. Addresses of the memories can also be exchanged during the program renewal operation and a verification step of ensuring that the renewal program has been accurately provided may also be executed.

14 Claims, 8 Drawing Sheets

DATA COMMUNICATION APPARATUS WITH A PROGRAM RENEWAL FUNCTION

BACKGROUND OF THE INVENTION

1. Field of the Invention

The present invention relates to a data communication apparatus which is applicable to, as examples, a facsimile apparatus, a personal computer, a copier, etc., and more particularly, to a data communication apparatus which includes a program renewal function.

2. Discussion of the Background

Data communication systems now exist in which a great number of data terminals may be connected to the same data communication system. In such a system, a program in each of the data terminals may need to be renewed or updated. In such a situation, it may be desirable to renew such a program through the data communication system, so that each data terminal has its program renewed or updated at the same time. This renewal operation may take place through a network, through a standard telephone line, etc., to which each of the data terminals is connected.

In such a situation, a host computer sends a new renewal program to each of the data terminals by the network or telephone line, and afterwards each of the data terminals renews an existing program with the newly transmitted program for renewal.

The renewal program often may be, for example, one of two types of programs. These two types of programs may be a system program for controlling and managing hardware of the data communication system or an application program, e.g. word processing. For example, a new program (system program/application program) may be received by a telephone line and stored in a memory under control of the system program. Then, the new program can be used to replace the old program, and then the new program will be implemented instead of the old program.

This new renewal program needs to be placed in the same designated memory areas as the old program. In this situation, it is required to remove the old program to another area of a memory so that the new renewal program can occupy the designated memory areas. In such an operation, the addresses of the old program are converted until the new program has been fully installed in the designated memory areas and is operational. To achieve this operation, one memory is divided into different areas in which the new renewal program and old program can be stored.

In this situation, if a power supply is interrupted while the new program is written into the memory, the new program will be cleared from the memory, and then the old program in its current state may be improperly stored in the memory because certain data of the old system program will have been rewritten. As a result, the program becomes defective and the data terminal may not be operational even after the power supply is restored, particularly if this program to be renewed is a system program.

Moreover, when confirmation and correction of the new program is not perfectly correct, it may occur that both programs become defective, and the data terminal will then also not be operational.

Moreover, in such an operation of supplying a new system program, a controller needs to convert the execution addresses of the old system program, and as a result the controller becomes heavily burdened with operations for such an address conversion.

SUMMARY OF THE INVENTION

Accordingly, one object of the present invention is to provide a novel data communication apparatus which is capable of updating a program easily and efficiently.

As a further feature of the novel communication apparatus of the present invention, if a supply of power is stopped while the new program is being stored, the system of the present invention will still be operational when the power supply is restored.

As a further feature of the present invention, the novel data communication apparatus of the present invention can execute an address conversion without unduly burdening a controller.

In order to achieve such objectives, the present invention sets forth a novel data communication apparatus which has a program renewal operation to renew an original program with a renewal program. The original program is stored in a first non-volatile memory, which also stores the renewal program after the program renewal operation has been completed. A second memory, which is distinct from this first memory, stores at least a predetermined portion of the original program during the program renewal operation. A controller renews the original program in the first memory with the renewal program by accessing the at least predetermined portion of the original program in the second memory during the program renewal operation. Such an operation of the present invention is particularly applicable where the original and renewal programs are system programs.

Moreover, the present invention sets forth an operation in which addresses of the memories can be exchanged during the program renewal operation.

The present invention is also directed to a method for effectuating such a renewal operation, which method can further include a verification step of ensuring that the renewal program has been accurately provided.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
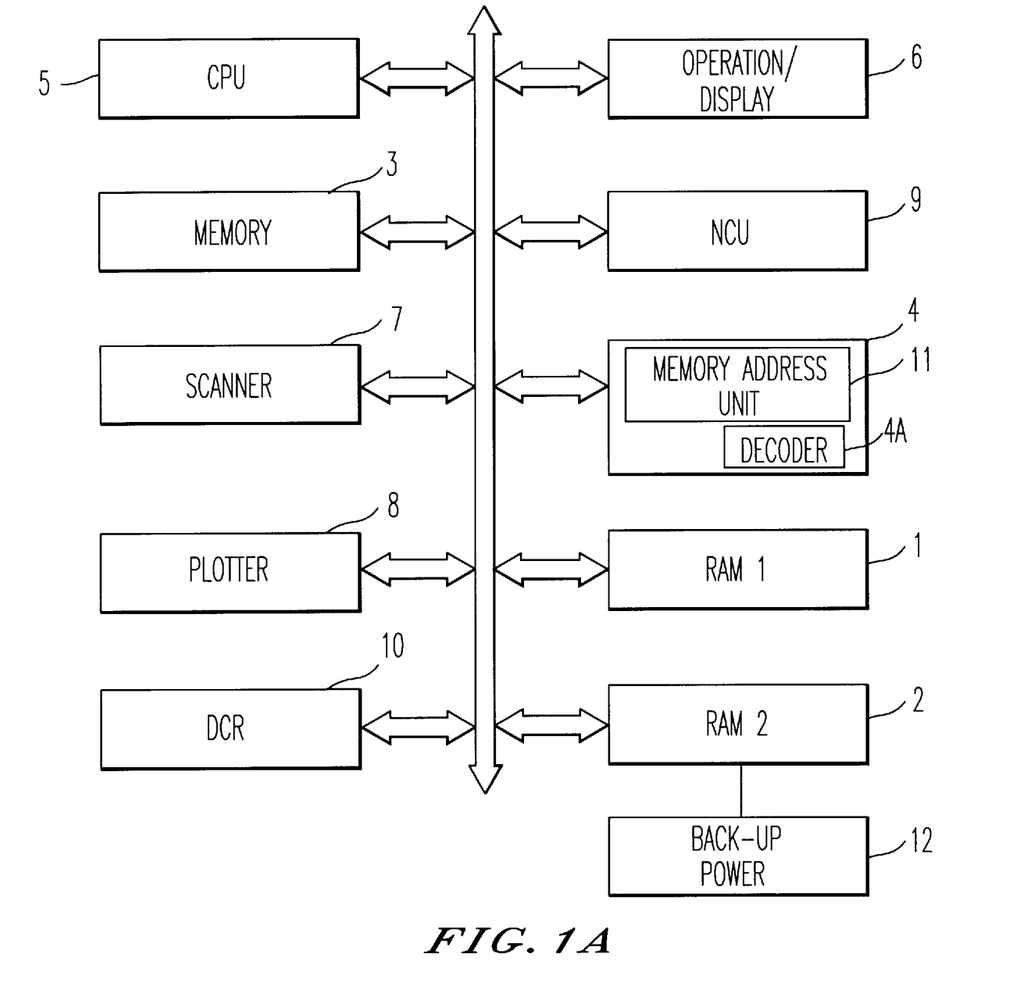
FIG. 1(a) is a block diagram showing a first embodiment of a data communication apparatus in accordance with the present invention.

Referring now to the drawings, wherein like reference numerals designate identical or corresponding parts throughout the several views, and more particularly to FIG. 1(a) thereof, a block diagram of a data communication apparatus, such as an apparatus which includes a facsimile communication function, in accordance with a first embodiment of the present invention is shown.

As shown in FIG. 1(a), the data communication apparatus of the present invention includes a RAM (random access memory) 1, a RAM 2, a non-volatile memory 3, for example which may be a flash memory, a memory address control unit 4, a control unit 5, an operation/display unit 6, a scanner unit 7, a plotter unit 8, a network communication unit 9, and a DCR (data compression and decompression) unit 10.

The RAM 1 stores compressed image information received through a network communication line, for example a telephone line, and decompressed image information from the DCR unit 10. The RAM 2 stores the system program during program renewal or updating and acts as a back-up unit. A dedicated back-up power supply source 12 (e.g. a battery back-up) is also connected to RAM 2. Thus, even if a power supply of the data communication apparatus is interrupted, stored information is maintained in the RAM 2 by use of such a back-up power supply 12.

Memory 3 is a non-volatile memory unit such as a flash memory, which controls all of the units of the apparatus based on a system program. That is, memory 3 stores a system program and is a non-volatile memory.

Figure 1B:
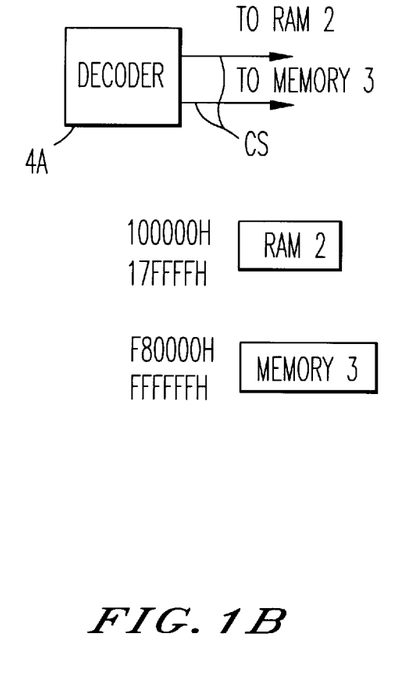
FIGS. 1(b) and 1(c) show specific elements of FIG. 1(a)
Figure 1C:
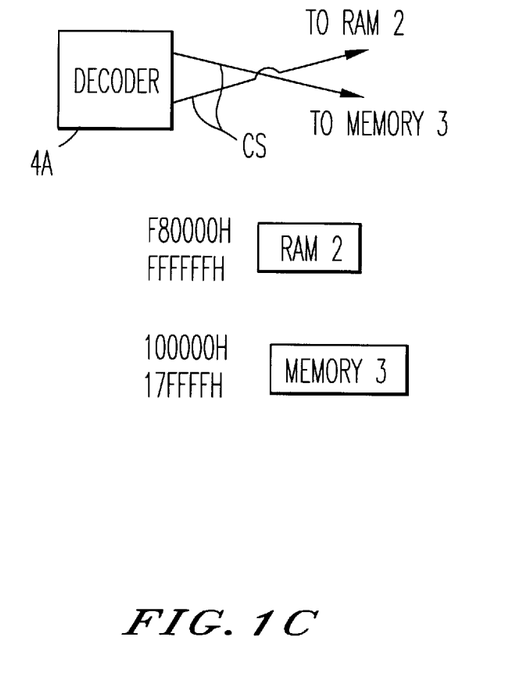

Memory address control unit 4 includes an address decoder 4a which is connected to the RAM 2 and the memory 3 through a chip select line (CS) and a memory address unit 11, see also FIGS. 1(b) and 1(c). The address decoder 4a exchanges an allotment of the address area of the memory RAM 2 and the memory 3 based on a state of a flag set in the memory address unit 11 by changing the chip select line.

FIGS. 1(b) and 1(c) detail the operation of the memory address control unit 4. As shown in FIGS. 1(b) and 1(c), this memory address control unit 4 is operable in two conditions. In a first condition, as shown in FIG. 1(b), the RAM 2 is designated memory areas 100000h through 17FFFFh and the memory 3 is designated memory areas F80000h through FFFFFFh. In a second condition as shown in FIG. 1(c), the memory address decoder 4a reverses the memory areas so that the RAM memory 2 is designated memory areas F80000h through FFFFFFh and the memory 3 is designated memory areas 100000h through 17FFFFh. In this way, this memory address decoder 4a can essentially switch or exchange the memory areas allocated to RAM 2 and memory 3.

The control unit 5 (CPU) controls and manages all of the units in the data communication apparatus. The operation/display unit 6 is a unit which may be provided with a keyboard and display panel for various messages and other information. The scanner unit 7 reads an original image at a predetermined resolution and the plotter unit 8 records a decompressed image information on a recording medium through the RAM 1. Network communication unit 9 may include a modem (modulator/demodulator) and a NCU (network control unit) and, as an example, communicates with a destination apparatus (for example a facsimile apparatus) through a telephone line and can send and receive facsimile information. The DCR unit 10 compresses original information in accordance with a predetermined algorithm and decompresses compressed image information received through the communication line, for example the telephone line, into original image information.

The operation of the device of the present invention will now be described in further detail.

Original information is read by the scanner unit 7 and is stored in the RAM 1 under control from the control unit 5. Then, the stored image information is compressed by the DCR unit 10 and is restored in the RAM 1 as compressed data. Also, the control unit 5 obtains operation information, such as a destination information, from the operation/display unit 6 and transfers such operation information to the network communication unit 9. The network communication unit 9 then calls the destination apparatus through the communication line, for example the telephone line, based on such operation information. After connection, the network communication unit 9 enforces a facsimile protocol with a destination apparatus, and a modem in the network communication unit 9 modulates the stored image information from the RAM 1. Then, the NCU of the network communication unit 9 sends the modulated image information to the destination apparatus through the communication line, for example the telephone line.

In the case of receiving data, after connection through the communication line, for example the telephone line, the NCU of the network communication unit 9 implements a facsimile protocol with the transmitting apparatus, and the network control unit receives compressed image data. This compressed image data is then stored in the RAM 1. Then, the DCR unit 10 decompresses the compressed image data stored in the RAM 1 to generate original image data. The plotter unit 8 then prints the original image data on a recording medium, such as a sheet of paper.

As noted above, the network communication unit 9 may include a modem and a NCU for computer data communication, and may also communicate computer data with the destination computer terminal through the communication line, e.g. telephone line.

Figure 2:
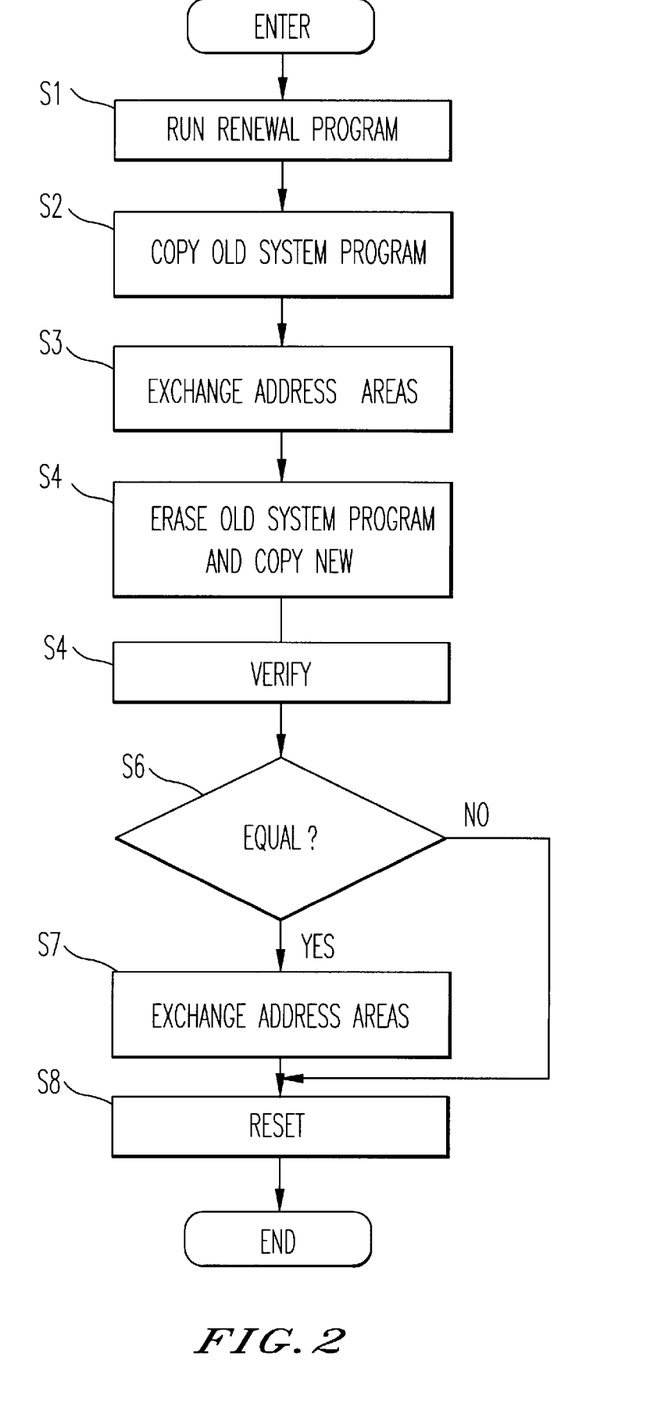
FIG. 2 is a flowchart showing an operation of the data communication apparatus according to the first embodiment of the present invention.

FIG. 2 is a flowchart illustrating how a program renewal or updating operation of a system program (as an example, other types of programs can also be renewed by this invention) is executed in the first embodiment of the present invention shown in FIG. 1.

As shown in FIG. 2, when the network communication unit 9 receives information from another apparatus (for example from a service center), and recognizes the received information as including a request for a program renewal or updating, the network communication unit 9 conveys such a request to the control unit 5, and the control unit 5 then runs a program (which is actually within the system program stored in memory 3) for the program renewal, see step S1.

Figure 3A:
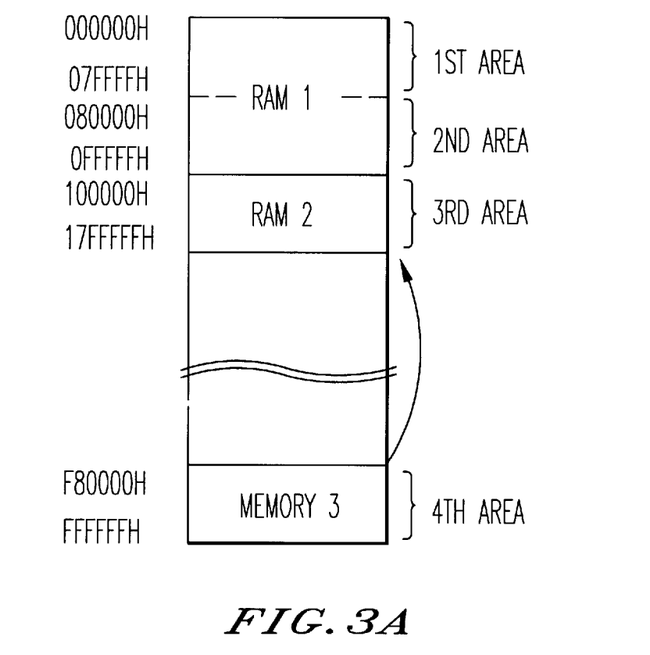
FIGS. 3(a) and 3(b) are schematic illustrations showing memory areas in the first embodiment of the present invention.

FIG. 3(a) shows how the memories in the first embodiment of FIG. 1 are allocated in such an operation of the present invention. As shown in FIG. 3(a), in RAM 1 a first memory area (000000h to 07FFFFh) is a program operation area and a second memory area (080000h to 0FFFFFh) is an area for storing a new system program. In RAM 2, a third memory area maintains the old system program during the program updating operation, indicated as memory areas 100000h to 17FFFFh. In memory 3, a fourth memory area is also provided for maintaining the system program, and is indicated as memory area F80000h to FFFFFFh. That is, this fourth memory area in memory 3 is the memory area where the old program is currently being stored, and where the renewal system program is to be stored. This memory 3 is distinct from the RAM 1 and RAM 2.

The control unit 5 effectuates a control to store the received new renewal program in the second memory area of the RAM 1, and copies the old system program from the memory 3 into the third area of the RAM 2, under control of the system program stored in memory 3, see step S2 in FIG. 2. Then, the control unit 5 sets a state of a flag, for example a bit "1", so that the chip select signal line is changed and the allotment of the address area of the RAM 2 and the memory 3 is exchanged, see the positioning in FIG. 1(c), so that the third memory area and the fourth memory area are exchanged, as shown in FIG. 3(b).

That is, the address decoder 4a exchanges the allotment of the address area of the RAM 2 and the memory 3 based on the flag "1" which is set by the control unit 5, see Step S3 in FIG. 2. In this way, the address decoder 4a adopts the conditions shown in FIG. 1(c).

With such an operation of the present invention, it is no longer required to convert memory addresses one by one by the CPU 5. This significantly reduces the burden on the CPU 5 and greatly improves system processing in the present invention. And further, the control unit 5 may execute a jump order or a subroutine call order, even though an address of the jump order or subroutine call order is included in the address area F80000h to FFFFFFh.

Figure 3B:
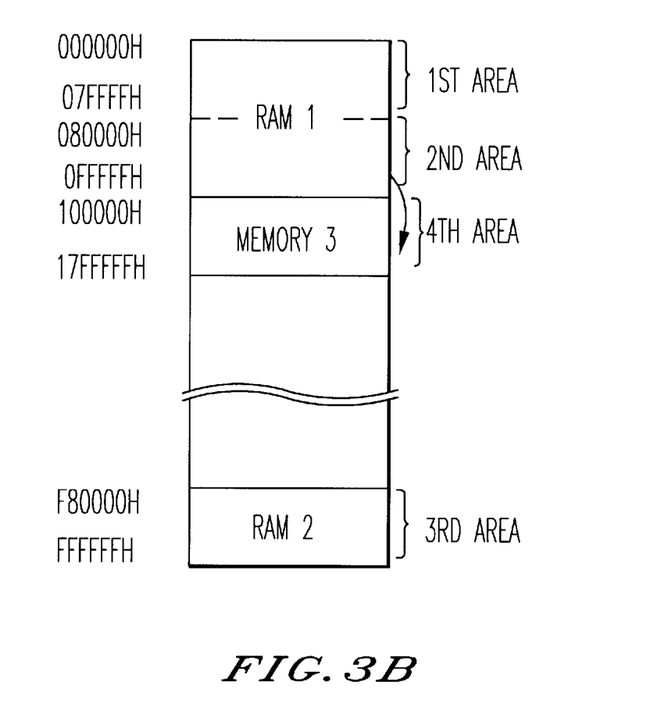

Then, the control unit 5 erases the old system program from the memory 3 and copies the new system program into the erased area of the memory 3, as indicated in step S4 and as shown by the arrow in FIG. 3(b). When the control unit 4 finishes copying the new system program to the memory 3, the control unit 5 compares the new system program in the memory 3 with the new system program in the RAM 1, as the new system program was initially stored in RAM 1, to check whether such programs are equal or not in step S5. This is a verification check step.

The system then proceeds to step S6 where it is determined whether or not the new system programs are equal. If the new system programs are different, i.e., NO in step S6, this indicates an error in the recording of the new renewal program in memory 3, and the control unit 5 then displays an error message due to the operation/display area unit 6 and resets the system to retry the program renewal operation. In the case that the control unit 5 resets the system, the control unit 5 resets the operation and runs the old system program from the RAM 2, and steps S1–S4 are repeated.

On the other hand, when the new system programs in memory 3 and in RAM 1 are equal, i.e., YES in step S6, the control unit 5 sets an indicating flag, for example bit "0", so that the address decoder 4a changes the chip select line back to the conditions shown in FIG. 1(b), and so that the allotment of the address area of the RAM 2 and memory 3 are then again exchanged, as indicated in step S7. The memory areas then again return to the state as shown in FIG. 3(a).

After this operation, the control unit 5 resets the system in step S8 and the control unit 5 runs the new renewal system program instead of the old system program.

In accordance with such an operation in the present invention, a third area corresponding to RAM 2 stores the old system program during the program renewal or updating operation, and this RAM 2 is backed up by the back-up power supply 12, so that the old system program is maintained in the RAM 2 even if the power supply is interrupted during the program updating operation. As a result, when the power supply of the apparatus is recovered, the control unit 5 may run the old system program, which is still accurately stored in RAM 2, and repeat steps S1 to S4 for the program renewal or updating operation.

Figure 4:
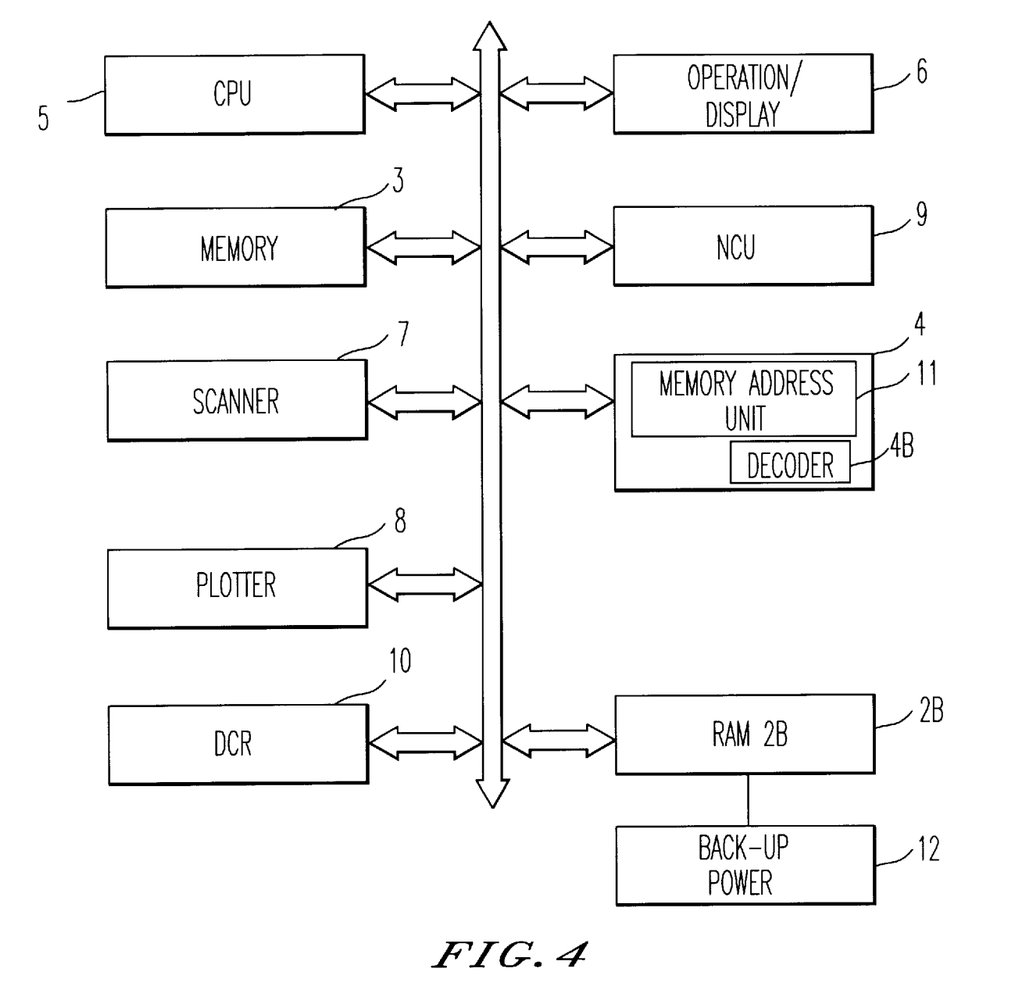
FIG. 4 is a block diagram showing a second embodiment of a data communication apparatus in accordance with the present invention.

FIG. 4 shows a data communication apparatus according to a second embodiment of the present invention which is also provided with memory 3, memory address control unit 4, control unit 5, operation/display unit 6, scanner unit 7, DCR unit 10, plotter 8, network communication unit 9 and back-up power supply 12, all of which are connected to each other in the same manner as shown in FIG. 1. In the second embodiment shown in FIG. 2, only a single RAM 2b is utilized, to which back-up power supply 12 is connected. This embodiment as shown in FIG. 4 differs from the embodiment of FIG. 1 in that only a single RAM 2b is utilized and address decoder 4b exchanges different addresses.

Figure 5A:
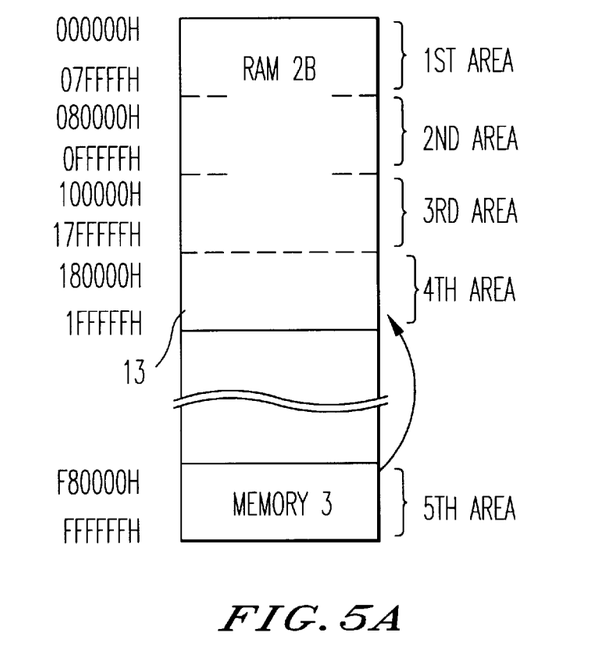
FIGS. 5(a) and 5(b) are schematic illustrations showing memory areas in the second embodiment of the present invention.

FIGS. 5(a) and 5(h) show the operation of such a device as shown in FIG. 4. As shown in FIG. 5(a), a first memory area (000000h to 07FFFFh) is a program operation area and a second memory area (080000h to 0FFFFFh) stores a new or renewal system program. A third memory area (1000000h to 17FFFFh) is a "don't care" area and a fourth memory area (180000h to 1FFFFFh) is used for maintaining the old system program in the RAM 2b. A fifth memory area (F80000h to FFFFFFh) maintains the system program in the memory 3, i.e. is the designated memory area for the system program.

The memory address control unit 4 includes an address decoder 4b which is connected to the RAM 2a and memory 3 through the chip select line (CS) and the memory address unit 11. This address decoder 4b differs from decoder 4a in the specific memory areas which it exchanges.

Figure 5B:
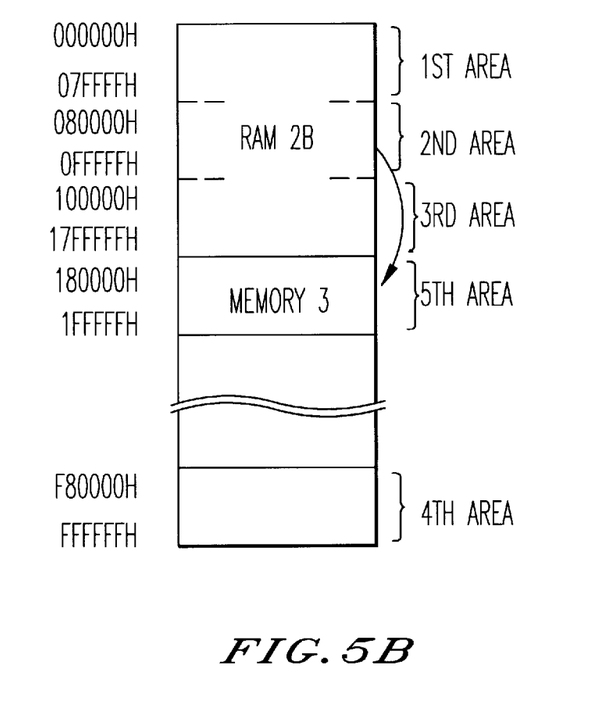

As shown in FIG. 5, the address decoder 4b exchanges allotment of designated address areas, i.e. the fourth memory area and the fifth memory area, based on a state of a flag in the memory address unit 11, by changing the chip select line, similarly as discussed above with respect to the first embodiment of the present invention. That is, the RAM 2a plays the same role as the RAM 1 and the RAM 2 in the first embodiment, but two random access memories are not required in this second embodiment, and this may result in a price cost reduction.

Figure 6:
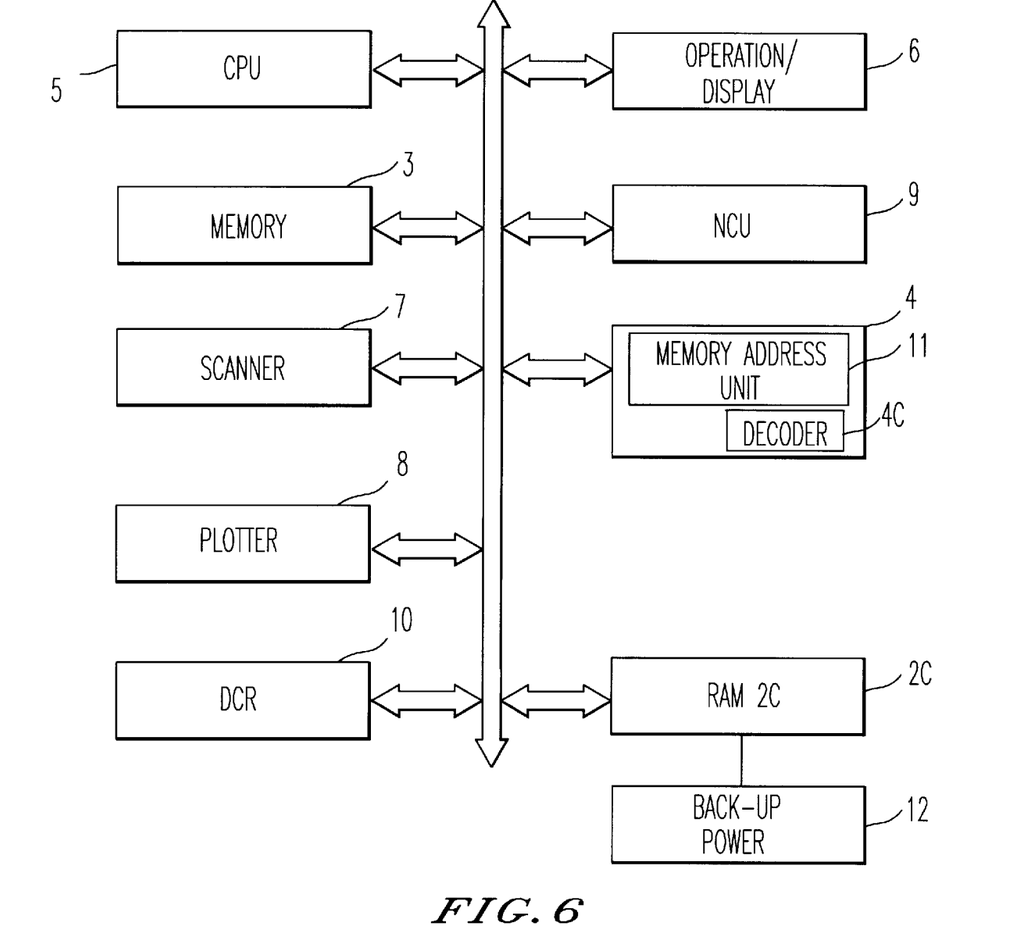
FIG. 6 is a block diagram showing a third embodiment of a data communication apparatus in accordance with the present invention.

FIG. 6 shows a third embodiment of the present invention in which the data communication apparatus is provided with memory 3, memory address control unit 4, control unit 5, operation/display unit 6, scanner 7, DCR unit 10, plotter 8, network communication 9 and back-up power supply 12, all of which are connected to each other in the same manner as shown in the first embodiment of FIG. 1. Further, the embodiment of FIG. 6 includes a single RAM 2c, which again is connected to back-up power supply 11.

The operation of this third embodiment of the present invention of FIG. 6 is further explained with reference to FIGS. 7(a) and 7(b).

Figure 7A:
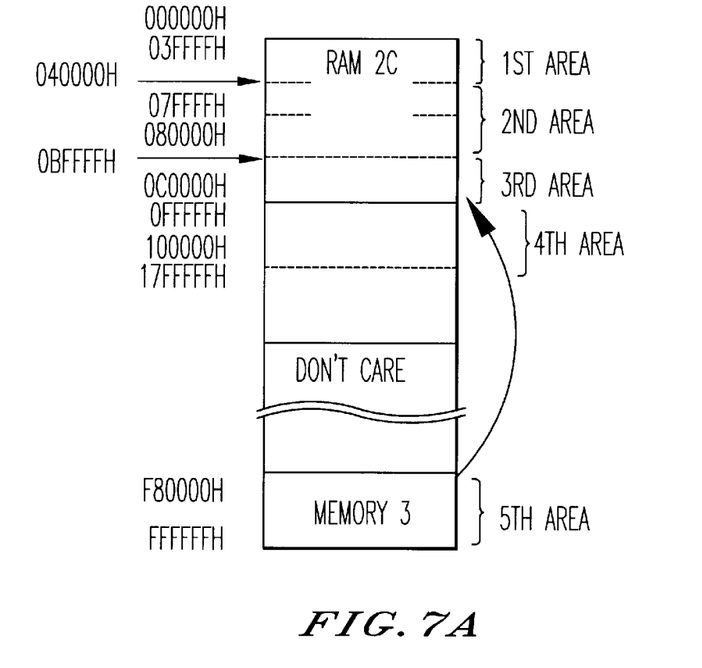
FIGS. 7(a) and 7(b) are schematic illustrations showing memory areas in the third embodiment of the present invention.

As shown in FIG. 7(a), a first memory area (000000h to 03FFFFh) is a program operation area and a second memory area (040000h to 0BFFFFh) stores a new system program. The third memory area (0C0000h to 0FFFFFh) stores a basic program of the old system program used for the program updating operation in the RAM 2c. The fourth memory area (100000h to 17FFFFh) is a "don't care" area and the fifth memory area (F80000h to FFFFFFh) maintains the system program in the memory 3.

The memory address control unit 4 includes an address decoder 4c which is connected to RAM 2c and memory 3 through a chip select line (CS), and memory address unit 11. This address decoder 4c differs from decoders 4a, 4b in the specific memory areas which it exchanges.

As shown in FIG. 7, the address decoder 4c exchanges an allotment of designated address memory areas, i.e. the address decoder 4c exchanges the allotment of the third memory area (0C0000h to 0FFFFFh) and the portion of the fifth memory area which stores the program for the system renewal operation, and an allotment of the fifth memory area which does not store the program the system renewal operation and the fourth memory area (100000h to 17FFFFh), based on a state of a flag in memory address unit 11 by changing the chip select line conditions, similarly as shown in FIGS. 1(b) and 1(c).

In accordance with this configuration, when a program updating or renewal operation is executed, the control unit 4 copies only a basic program (only a portion) of the old system program, specifically the portion of the old system program which controls the renewal or updating operation, and the subroutines used during the program renewal or updating operation, and executes a jump order and a subrouting call that occurs in the program renewal operation, and arranges and serially stores such data in the third memory area of RAM 2c. The other programs of the old system program are placed in the "don't care" fourth memory area.

Figure 7B:
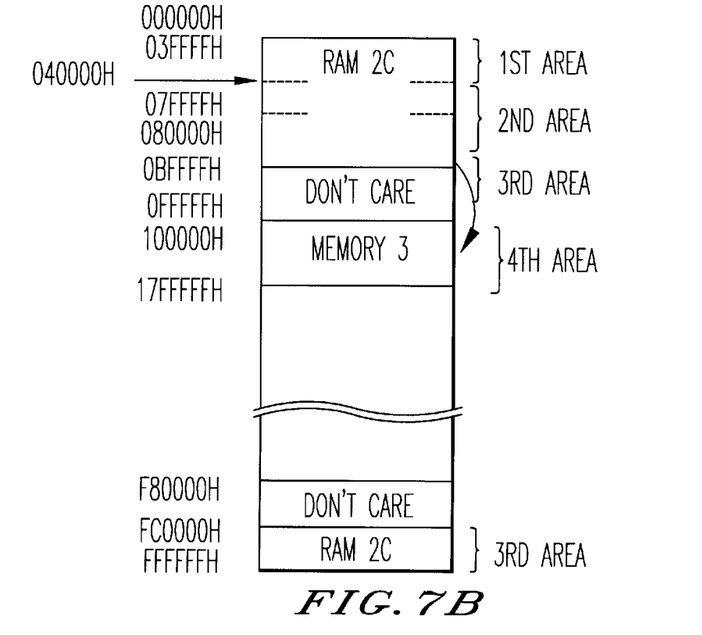

The control operation for this embodiment of FIGS. 6 and 7 is similar to that shown in FIG. 2. In this control operation the control unit 5 receives a new or renewal system program and stores the received new system program in the second memory area, but copies only a basic program (the portion which controls program renewal) of the old system program in the memory 3 into the RAM 2c in steps S1 and S2 of FIG. 2. Then, the control unit 5 sets a flag, for example as a bit "1", so that the chip select CS line is changed and the allotment of the address areas of the RAM 2c (0C0000h to 0FFFFFh) and the memory 3 (F80000h to FFFFFFh) is exchanged in step S3, so that the third memory area and the fifth memory area are exchanged as shown in FIG. 7(b). That is, the address decoder 4c changes the allotment of the address areas of the RAM 2c and the memory 3 based on the state of the flag which is set by the control unit 5.

As a result, in this further embodiment of the present invention, it is not required to convert addresses one by one. Further, the control unit 5 may execute a jump order or a subroutine call order normally, even though an address of the jump order or subroutine call order is included in the address area F80000h to FFFFFFh.

Then, the control unit 5 erases the old system program from the memory 3 and copies the new system program into the erased area in the memory 3 in step S4, as shown by the arrow in FIG. 7(b). When the control unit 4 finishes copying the new system program into the memory 3, the control unit 5 compares the new system program in the memory 3 and the RAM 1 to check whether such programs are equal or not in step S5. This is again a verifying check operation.

In step S6, it is then determined whether or not the new system program and the system program stored in RAM 1 are equal. If these programs are different, i.e. NO in step S6, the control unit 5 displays an error message on the operation/display unit 5 and resets the system to retry the program updating or renewal operation. If the control unit does reset the system, the control unit 5 runs the old system program in the RAM 2, and requests to again receive the new renewal system program, and steps S11–S14 are repeated.

On the other hand, when the system programs are determined as being equal, i.e., YES in step S16, the control unit 5 sets a flag, for example as a bit "0", so that the address decoder 4c changes the chip select line, and then the allotment of the address area of the RAM 2 and the memory 3 are returned to as shown in FIG. 7(a), in step S7. Then, the control unit 5 resets the system in step S8 and the control unit 5 runs the new system program instead of the old system program.

It is also noted that decoding the address, selecting the chip select line and accessing the address area are executed by a logic circuit in the memory address unit 11.

In this further embodiment, it is only needed to copy a part of the system program, that part which controls the program renewal operation, so that a capacity of the random access memory 2 can be decreased, which may also lead to a further reduction in price.

obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A data communication apparatus having a program renewal operation to renew an original program with a renewal program, comprising:

a non-volatile first memory area configured to store the original program prior to the program renewal operation and to store the renewal program after completion of the program renewal operation;

a second memory area configured to store said original program copied from said first memory area during the program renewal operation;

a third memory area in which the renewal program is temporarily stored during the program renewal operation;

a controller configured to replace the original program stored in said first memory area prior to said program renewal operation with the renewal program temporarily stored in said third memory area during the program renewal operation; and an address controller configured to exchange memory addresses of the first and second memory areas so that the controller replaces the original program stored in said first memory area with the renewal program temporarily stored in said third memory area in memory addresses in said first memory area exchanged with memory addresses of said second memory area.

2. The data communication apparatus according to claim 1, wherein the original and renewal programs are system programs.

3. The data communication apparatus according to claim 1, wherein the controller receives the renewal program through a data communication line.

4. The data communication apparatus according to claim 3, wherein the data communication line is a telephone line.

5. The data communication apparatus according to claim 1, further comprising a back-up power supply connected to the second memory area.

6. The data communication apparatus according to claim 1, wherein the controller further verifies the renewal program by comparing the renewal program from the third memory area and the first memory area.

7. A data communication apparatus having a program renewal operation to renew an original program with a renewal program, comprising:

a non-volatile first memory means for storing the original program prior to the program renewal operation and for storing the renewal program after completion of the program renewal operation;

a second memory means for storing said original program copied from said first memory means during the program renewal operation;

a third memory means for temporarily storing the renewal program during the program renewal operation;

a controller means for replacing the original program stored in said first memory means prior to said program renewal operation with the renewal program temporarily stored in said third memory means during the program renewal operation; and an address controller means for exchanging memory addresses of the first and second memory means so that the controller means replaces the original program stored in said first memory means with the renewal program temporarily stored in said third memory means in memory addresses in said first memory means exchanged with memory addresses of said second memory means.

8. The data communication apparatus according to claim 7, wherein the original and renewal programs are system programs.

9. The data communication apparatus according to claim 7, wherein the controller means receives the renewal program through a data communication means.

10. The data communication apparatus according to claim 9, wherein the data communication means is a telephone line.

11. The data communication apparatus according to claim 7, further comprising a back-up power supply means connected to the second memory means.

12. The data communication apparatus according to claim 7, wherein the controller means further verifies the renewal program by comparing the renewal program from the third memory means and the first memory means.

13. A method of renewing an original program with a renewal program in a data communication apparatus, comprising:

first storing the original program in a non-volatile first memory area prior to the program renewal operation;

copying the original program from said first memory area to a second memory area during the program renewal operation;

temporarily storing the renewal program in a third memory area during the program renewal operation; and replacing the original program stored in said first memory area with the renewal program temporarily stored in said third memory area during the program renewal operation, including exchanging memory addresses of the first and second memory areas so that the original program stored in said first memory area is replaced with the renewal program temporarily stored in said third memory area in memory addresses in said first memory area exchanged with memory addresses of said second memory area.

14. The method according to claim 13, further comprising the step of verifying the renewal program by comparing the renewal program stored in the first memory area and the renewal program stored in the third memory area.

* * * * *